United States Patent [19]

Charles et al.

[11] 4,140,670

[45] Feb. 20, 1979

[54] PBT INJECTION MOLDING COMPOSITION

[75] Inventors: John J. Charles, Bloomingdale; Robert C. Gasman, West Milford, both of N.J.

[73] Assignee: GAF Corporation, New York, N.Y.

[21] Appl. No.: 814,535

[22] Filed: Jul. 11, 1977

[51] Int. Cl.$^2$ ............................ C08K 3/34; C08K 7/14
[52] U.S. Cl. .................................. 260/40 R; 260/860; 260/873
[58] Field of Search ................. 260/40 R, 862, 873

[56] References Cited

U.S. PATENT DOCUMENTS

| | | | |
|---|---|---|---|
| 3,652,713 | 3/1972 | Akazaki et al. | 260/860 |
| 3,701,755 | 10/1972 | Sumoto et al. | 260/860 X |
| 3,763,109 | 10/1973 | Witsiepe | 260/75 R |
| 3,963,800 | 6/1976 | Gipp et al. | 260/860 |
| 4,011,285 | 3/1977 | Seymour et al. | 260/40 R X |
| 4,013,613 | 3/1977 | Abolins et al. | 260/40 R |
| 4,035,333 | 7/1977 | Kamoda et al. | 260/873 X |
| 4,064,098 | 12/1977 | Sartoh et al. | 260/40 R |

FOREIGN PATENT DOCUMENTS 1467523  3/1977  United Kingdom.

OTHER PUBLICATIONS

F. W. Maine and P. D. Shepherd, "Mica Reinforced Plastics: A Review," *Composites*, pp. 193-200, (Sept. 1974).

W. T. Collins & J. L. Kludt, "New Silane Coupling Agents for Sphere and Mineral Reinforced Engineering Thermoplastics," 30th Anny. Tech. Conf. 1975, Society of Plastics Industry, Inc.

"Low-Cost Suzorite Mica Flake Prevents Distortion in PBT," Marietta Resources Intern'l, Ltd., publ. Aug. 1976.

*Primary Examiner*—Sandra M. Person
*Attorney, Agent, or Firm*—Walter C. Kehm; Joshua J. Ward

[57] ABSTRACT

Molding compositon and molded products comprising polybutylene terephthalate containing thermally stable reinforcing fibers, such as glass fibers, mica and between about 5 and about 40 wt. % based on total weight of PBT molding composition of poly (butylene terephthalate-co-tetramethylene oxide). In a preferred embodiment, the composition also includes amorphous, thermally stable resins such as polymethyl methacrylate.

19 Claims, No Drawings

PBT INJECTION MOLDING COMPOSITION

BACKGROUND OF THE INVENTION

Polybutylene terephthalate (PBT) reinforced with thermally stable reinforcing fibers such as glass fibers is well known as a molding resin and is described in numerous patents and publications including for instance U.S. Pat. No. 3,814,725, U.S. Pat. No. 3,814,786 and U.S. Pat. No. 3,624,024. Fiber reinforcement generally improves the tensile strength, flexural strength, flexural modulus and heat deflection temperature of the molding composition. However, moldings, especially injection moldings of large fiber reinforced articles of PBT, tend to display distortion or warping while some other resins of otherwise less desirable properties do not present such problems. It is believed that strains resulting from the different rates at which resin and glass contract during the cooling of molded articles are responsible for such warping. The warping is thus believed due to the presence of the very reinforcing fibers which contribute to the enhanced physical characteristics of the finished product. It is known that addition of mica to fiber glass reinforced PBT reduces warping. Unfortunately, the mica also greatly reduces impact strength.

SUMMARY OF THE INVENTION

It is accordingly an object of the invention to provide an improved fiber reinforced PBT molding composition and method for producing same as well as molded articles of such composition. As compared with known prior art compositions, the molded compositions of the invention have substantially less distortion due to warping while at the same time having improved impact strength as compared with previously available low warp compositions and retaining substantially all of the improved physical properties imparted by reinforcing fibers.

Molding compositions of the invention comprise at least about 20 wt % PBT having an intrinsic viscosity (I.V.) between about 0.5 and about 2.0 deciliters per gram (dl/g) and contain:

(a) between about 3 and about 50 wt % based on total weight of PBT molding composition of thermally stable reinforcing fibers having diameters between about 5 and about 20 microns and aspect ratios of at least about 5.

(b) between about 1 and about 50 wt % based on total PBT molding composition of phlogopite mica having an average particle size between about 40 and about 325 mesh with at least about 90% of such mica having particle sizes between about 40 and about 200 mesh.

(c) between about 5 and about 40 wt % based on the total weight of PBT molding composition of poly (butylene terephthalate-co-tetramethylene oxide) having a Shore D hardness between about 50 and about 60 and a melt index between about 7 and about 9.

In a preferred embodiment the molding resin of the invention also contains between about 1 and about 25 wt % based on total PBT molding composition of an amorphous, thermally stable resin such as polymethyl methacrylate. Further preferred embodiments involve the use of glass fibers as the reinforcing fibers. The invention also contemplates a method for producing molding resin of the invention by intimately blending the above mentioned ingredients of such resin and also contemplates molded products made from molding compositions of the invention.

DETAILED DESCRIPTION OF THE INVENTION

As mentioned above, the invention includes a novel molding composition, molded articles of such composition and method for producing such composition. The molding composition broadly comprises between about 20 and about 95 wt % PBT having an intrinsic viscosity between about 0.5 and about 2.0 dl/g and containing thermally stable reinforcing fibers, mica and poly (butylene terephthalate-co-tetramethylene oxide) as described above.

Polybutylene terephthalate (PBT) used in the invention may be produced in any suitable manner such as by reacting terephthalic acid or a dialkyl ester of terephthalic acid, e.g., dimethyl terephthalate, with diols having four carbon atoms, e.g., tetramethylene glycol. PBT for use in the invention has an instrinsic viscosity (I.V.) between about 0.5 and about 2.0 dl/g measured in orthochlorophenol at 25° C., with material having an I.V. between about 0.5 and about 1.1 dl/g being preferred. Manufacture of PBT is well known to those skilled in the art as are the techniques for obtaining PBT of desired intrinsic viscosity. Such conventional production techniques for PBT are discussed in greater detail for instance in U.S. Pat. No. 3,465,319.

Thermally stable reinforcing fibers used in the invention may be any such fibers which are thermally stable at the conditions normally used in the production of products from PBT molding compositions and include for instance fibers of materials such as glass, asbestos, carbon, fibrous potassium titanate, iron whiskers, etc. Such fibers should normally have diameters between about 5 and about 20 microns and aspect ratios (ratio of length of fiber to diameter of fiber) of at least about 5. Glass fibers are preferred for use in the invention. Glass fibers, where used, preferably have diameters between about 10 and about 15 microns and aspect ratios of at least about 20.

Reinforcing fibers used in the invention are normally used in amounts between about 3 and about 50 wt % based on total weight of PBT molding composition, more preferably in amounts between about 3 and about 20 wt % on the same basis. As is commonly recognized, the use of such fibers improves substantially such physical properties as tensile strength, flexural strength, flexural modulus and heat distortion temperature of the PBT. Glass or other fibers for use in the invention may be manufactured and incorporated into the PBT in any suitable manner, such as by separate extrusion blending with the PBT, extrusion blending with other ingredients of the compositions of the invention or incorporating into the PBT or PBT containing composition during injection molding of products from the PBT.

As mentioned above, products molded from fiber reinforced PBT, while having substantially improved physical properties in certain respects, suffer from excessive warpage believed to be due to the presence of the fibers. It is thus necessary in accordance with the present invention to incorporate in the compositions and the products of the invention additional filler material for the purpose of reducing the adverse effect of the reinforcing fibers on warpage. More specifically, the present invention requires the use of between about 1 and about 40 wt % based on total molding composition of phlogopite mica having an average particle size between about 40 and about 325 mesh with at least about 90% of such mica having particle sizes between about 40 and about 200 mesh. To alleviate the adverse effect of mica on impact strength, the invention also requires the presence of between about 5 and about 40 wt % based on total weight of PBT molding composition of poly (butylene terephthalate-co-tetramethylene oxide) having a Shore D hardness between about 50 and about 60 and a melt index between about 7 and about 9.

In addition to the above mentioned essential ingredients of the composition and products of the invention, the use of an additional ingredient, i.e., an amorphous, thermally stable resin in amounts between about 1 and about 25 wt % based on total weight of PBT molding composition is preferred. Suitable resins for this purpose include generally any amorphous resin which is thermally stable under the conditions used in forming molded products from PBT and may include such diverse materials as polymethyl methacrylate, poly (butyl methacrylate-co-methyl methacrylate) poly (ethylacrylate-co-methyl) methacrylate), polycarbonate, polysulfone, polyethylene terephthalate, etc. An especially preferred amorphous resin for use in the invention is polymethyl methacrylate, generally available under the trade name Lucite or Plexiglas. Amorphous resin used in the invention, especially the preferred polymethyl methacrylate, is preferably resin having a melt index between about 1 and about 25.

In addition to the ingredients mentioned above, compositions and products of the invention may contain suitable flame retardant additives in amounts up to about 20 wt % based on total molding composition and may contain relatively minor amounts of other materials which do not unduly affect the desired characteristics of the finished products. Such additional materials, may, depending upon the particular compositions employed and products desired, include for instance, colorants and lubricants. Where present, such additional materials normally comprise no more than about 5 wt % of the total composition or finished product.

In preparing molded compositions of the invention, the reinforcing fibers may be intimately blended into the PBT by any suitable means such as by dry blending or melt blending, blending in extruders, heated rolls or other types of mixers, etc. Conventional master batching techniques may also be used. The same considerations apply to addition of the other essential or optional ingredients of the composition of the invention, including specifically the inert filler of low aspect ratio, the poly (butylene terephthalate-co-tetramethylene oxide) and the amorphous, thermally stable resin. Suitable blending and molding techniques are well known in the art and need not be described in detail herein. In a preferred embodiment of the invention, the composition of the invention is compounded by dry blending followed by melt mixing in an extruder with barrel temperatures between about 240 and about 270° C. Likewise, in molding products of the invention from molding compositions of the invention, injection molding is preferred. When injection molding is used, barrel temperatures between about 450 and 500° F are preferred. In a preferred embodiment, the molding composition of the invention is formed by extrusion and pelletized. Products of the invention are then produced by injection molding the pelletized extrudate.

As mentioned above, one of the major advantages of the compositions and products of the invention is that the addition of mica and poly (butylene terephthalate-co-tetramethylene oxide) to glass fiber reinforced PBT substantially reduces shrinkage and warpage normally associated with the use of reinforcing fibers without substantial harm to the desirable improvements in physical properties associated with the use of such fibers. While warpage is frequently determined by visual inspection, a quantitative definition can be expressed in terms of percent warp equals $(dm-t) \times 100/t$ where "dm" equals maximum distance from a flat surface to a point on a warped side of the article being evaluated, and "t" equals the thickness of the warped side of the article. This equation defines warp in terms of wall thickness without regard to length of the part. Since some absolute deviation from a straight line gives the same percent warp, a correction for part length must also be included to more accurately define warpage of a part in terms of the visual effect of the warp. Part warp (PW) may therefore be defined as PW = % warp/L = $(dm-t) \times 100/txL$ wherein PW equals part warp, "L" equals total length of the warp member and the other values are as stated immediately above. In evaluating warpage of samples and products, an average warpage value for a five sided plain box is frequently calculated based upon measurements of warpage of the right, left, front and back sides of the box.

The following example is intended to illustrate the application and usefulness of the invention without limiting the scope thereof. In the example, all quantities are given in terms of weight percent based on total composition unless otherwise specified. Physical properties, including warpage, were measured by the following criteria and reported as an average of samples of each composition tested:

| Property | Test Procedures |
| --- | --- |
| Tensile Yield Strength | ASTM D-638 |
| Flexural Yield Strength | ASTM D-790 |
| Flexural Modulus | ASTM D-790 |
| Notched Izod Impart | ASTM D-256 |
| Unnotched Izod Impart | ASTM D-256 |
| Heat Deflection at 264 psi | ASTM D-748 |
| Percent warp | As defined above |

EXAMPLE

PBT (0.8 I.V.) was compounded on a Midland Ross 1.5 inch extruder with 60 pounds of phlogopite mica per hundred pounds of resin and mica flakes to form a masterbatch. The mica used was Marietta Resources International Suzorite HAR 60S having the following size distribution:

| | |
| --- | --- |
| 0.2% | −20 + 40 mesh (U.S. sieve) |
| 76.1% | −40 + 100 mesh |
| 19.2% | −100 + 200 mesh |
| 2.99% | −200 + 325 mesh |
| 1.6% | −325 mesh | the following conditions were employed.

| Extruder Zone | Temperatures | Back Pressure 0–200 |
| --- | --- | --- |
| 1 | 240° C. | Amperage 20–25 |
| 2 | 240° C. | Screw rpm 75 |
| 3 | 245° C. | |
| 4 | 250° C. | melt temperature 245° C. |
| 5 | 255° C. | |

The mica masterbatch pelletized extrudate was then dry blended with other materials to produce the composition shown in Table I and molded on a 50 ton, 3 oz. reciprocating screw injection molding machine to provide ASTM test specimens. Parts suitable for measuring warpage (camera slide storage box with four large flat sides) were molded on a 350 ton, 36 oz. Impco screw ram machine. Molding conditions were:

```
       3 oz., 50 ton molding machine
Barrel temperature        front      480° F.
                          rear       480° F.
                          nozzle     480° F.
Injection pressure        1100 psi
Screw rpm                 75
Injection time            10 sec.
Mold time                 20 sec.
Total Cycle time          30 sec.
Mold temperature          100° F.
      36 oz., 350 ton molding machine
Barrel temperature        front      480° F.
                          center     480° F.
                          rear       480° F.
                          nozzle     490° F.
Measured melt temperature 420° F.
Screw rpm                 80
Total cycle time          94 sec.
Mold temperature          175° F.
Mold time                 40 sec.
Injection Pressure        1100 psi
```

The material identified in Table I as Hytrel 5556 was poly (butylene terephthalate-co-tetramethylene oxide) having a Shore D hardness of 55 and a melt index of 7. Physical properties were as shown in Table II.

TABLE I

Composition of PBT Compounds

| Composition No. | % 60-S Mica | % PBT 0.8 I.V. | % Hytrel 5556 | % Glass fiber 3/16 in. | % poly methyl methacrylate |
|---|---|---|---|---|---|
| 1 | 30 | 35 | 15 | 5 | 15 |
| 2 | 15 | 70 | 5 | 5 | 5 |
| 3 | 15 | 55 | 5 | 10 | 15 |
| 4 | 30 | 40 | 15 | 10 | 5 |
| 5 | 30 | 70 | — | — | — |
| 6 | 30 | 60 | — | 10 | — |
| 7 | 30 | 55 | 15 | — | — |
| 8 | 30 | 45 | 15 | 10 | — |
| 9 | — | 70 | — | 30 | — |

TABLE II

Warpage and Mechanical Properties of Mineral PBT Compounds

| Composition No. | Notched Izod Impact ft.lbs/in. | Unnotched Izod Impact ft.lb/in. | Tensile Strength psi | Flexural Modulus × 10' psi | Flexural Strength psi | Heat Deflection at 265 psi ASTM D-748, ° C | % Elongation at break | % Warp of Unannealed Parts | % Warp of Annealed Parts at 375° F. for 1 hr. |
|---|---|---|---|---|---|---|---|---|---|
| 1 | .81 | 3.2 | 7660 | 1155 | 12890 | 140 | 3.9 | 51 | 83 |
| 2 | .64 | 2.8 | 9310 | 794 | 14500 | 162 | 5.3 | 112 | 115 |
| 3 | .74 | 3.0 | 9862 | 919 | 16480 | 175 | 4.3 | 86 | 144 |
| 4 | .92 | 2.8 | 9204 | 1191 | 14030 | 181 | 3.6 | 56 | 92 |
| 5 | .86 | 1.5 | | | | | | 87 | 98 |
| 6 | .99 | 3.1 | | | | | | 61 | 81 |
| 7 | .92 | 2.0 | | | | | | 87 | 94 |
| 8 | 1.12 | 4.1 | | | | | | | |
| 9 | 1.8 | 9.7 | 18400 | 1222 | 29,000 | 210 | — | 457 | |

While the invention has been described above with respect to preferred embodiments thereof, it will be understood that changes and modifications may be made without departing from the spirit and scope of the invention.

What is claimed is:

1. Molding composition comprising at least about 20 wt % PBT having an intrinsic viscosity between about 0.5 and about 2.0 dl/g and containing:
   a. between about 3 and about 50 wt % based on total molding composition of thermally stable reinforcing fibers having diameters between about 5 and about 20 microns and aspect ratios of at least about 5;
   b. between about 1 and about 40 wt % based on total molding composition of phlogopite mica having an average particle size between about 40 and about 325 mesh with at least about 90% of such mica having particle sizes between about 40 and about 200 mesh;
   c. between about 5 and about 40 wt % based on total molding composition of poly (butylene terephthalate-co-tetramethylene oxide) having a Shore D hardness between about 50 and about 60 and a melt index between about 7 and about 9.

2. Molding composition according to claim 1 which also contains between about 1 and about 25 wt % based on total molding composition of an amorphous, thermally stable resin.

3. Molding composition according to claim 2 in which the reinforcing fibers are glass fibers.

4. Molding composition according to claim 3 in which the fibers have diameters between about 10 and about 15 microns and aspect ratios of at least about 20.

5. Molding composition according to claim 3 wherein the amorphous, thermally stable resin is polymethyl methacrylate.

6. Molding composition according to claim 2 wherein the reinforcing fibers are glass fibers having diameters between about 10 and about 15 microns and aspect ratios of at least about 20, and the amorphous, thermally stable resin is polymethyl methacrylate having a melt index between about 1 and about 25.

7. A molded article of the molding composition of claim 1.

8. A molded article of the molding composition of claim 2.

9. A molded article of the molding composition of claim 3.

10. A molded article of the molding composition of claim 4.

11. A molded article of the molding composition of claim 5.

12. A molded article of the molding composition of claim 6.

13. A method for producing improved molding composition comprising intimately blending PBT having an intrinsic viscosity between about 0.5 and about 2.0 deciliters per gram with;
   a. between about 3 and about 50 wt % based on the total weight of PBT molding composition of thermally stable reinforcing fibers having diameters between about 5 and about 20 microns and aspect ratios of at least about 5;

b. between about 1 and about 40 wt % based on total molding composition of phlogopite mica having an average particle size between about 40 and about 325 mesh with at least about 90% of such mica having particle sizes between about 40 and about 200 mesh;

c. between about 5 and about 40 wt % based on total weight of PBT molding composition of poly (butylene terephthalate-co-tetramethylene oxide) having a Shore D hardness between about 50 and about 60 and a melt index between about 7 and about 9.

14. Method according to claim 13 wherein between about 1 and about 25 wt % based on total molding composition of an amorphous, thermally stable resin is also intimately blended into the composition.

15. Method according to claim 14 wherein the reinforcing fibers are glass fibers.

16. Method according to claim 15 wherein the fibers have diameters between about 10 and about 15 microns and aspect ratios of at least about 20.

17. Method according to claim 15 wherein the amorphous, thermally stable resin is polymethyl methacrylate.

18. Method according to claim 14 wherein the reinforcing fibers are glass fibers having diameters between about 10 and about 15 microns and aspect ratios of at least about 20, and the amorphous, thermally stable resin is polymethyl methacrylate having a melt index between about 1 and about 25.

19. Molding composition according to claim 1 which further contains flame retardant additives in amounts up to 30 wt % of the total molding composition.

* * * * *